United States Patent
Lee et al.

(10) Patent No.: US 7,781,714 B2
(45) Date of Patent: Aug. 24, 2010

(54) PROJECTION DISPLAY ADOPTING LINE TYPE LIGHT MODULATOR INCLUDING A SCROLL UNIT

(75) Inventors: Young-chol Lee, Gunpo-si (KR); Joon-seok Moon, Yongin-si (KR); Kirill Sokolov, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 664 days.

(21) Appl. No.: 11/748,227

(22) Filed: May 14, 2007

(65) Prior Publication Data
US 2007/0268458 A1    Nov. 22, 2007

Related U.S. Application Data

(60) Provisional application No. 60/802,165, filed on May 22, 2006.

(30) Foreign Application Priority Data
Jul. 6, 2006    (KR) .................. 10-2006-0063488

(51) Int. Cl.
    H01L 27/00    (2006.01)
(52) U.S. Cl. ..................... 250/208.1; 250/234
(58) Field of Classification Search ............. 250/208.1, 250/216, 234–236; 353/31, 34, 37, 81, 102; 359/202–211
See application file for complete search history.

(56) References Cited

U.S. PATENT DOCUMENTS

| | | | |
|---|---|---|---|
| 4,474,422 A * | 10/1984 | Kitamura | ................ 359/204.1 |
| 6,614,580 B2 | 9/2003 | Amm | |
| 2003/0030913 A1 | 2/2003 | Park et al. | |

FOREIGN PATENT DOCUMENTS

| | | |
|---|---|---|
| EP | 0884914 A1 | 12/1998 |
| EP | 1359752 A2 | 11/2003 |
| EP | 1463335 A2 | 9/2004 |
| KR | 2002-0027580 A | 4/2002 |
| WO | 02/01884 A2 | 1/2002 |

* cited by examiner

*Primary Examiner*—Que T Le
(74) *Attorney, Agent, or Firm*—Sughrue Mion, PLLC

(57) ABSTRACT

A projection display projects color images on a screen. The projection display includes: an illuminating unit which emits a plurality of linear beams that are in parallel to each other; a scroll unit which scrolls the plurality of linear beams; a line type light modulator which modulates the plurality of linear beams according to image signals; and a scan unit which scans the plurality of linear beams in a direction perpendicular to the scrolling direction.

5 Claims, 12 Drawing Sheets

PROJECTION DISPLAY ADOPTING LINE TYPE LIGHT MODULATOR INCLUDING A SCROLL UNIT

CROSS-REFERENCE TO RELATED PATENT APPLICATIONS

This application claims priority from Korean Patent Application No. 10-2006-0063488, filed on Jul. 6, 2006, in the Korean Intellectual Property Office, and the benefit of U.S. Patent Application No. 60/802,165, filed on May 22, 2006, in United States Patent and Trademark Office, the disclosures of which are incorporated herein in their entirety by reference.

BACKGROUND OF THE INVENTION

1. Field of the Invention apparatuses consistent with the present invention relate to a projection display for displaying color images by modulating a plurality of single color lights to correspond to image information and projecting the lights onto a screen, and more particularly, to a projection display adopting a line type light modulator.

2. Description of the Related Art

A projection display includes a light modulator which modulates light corresponding to image information, and an illuminating unit for illuminating the modulated light. A conventional projection display utilizes a two-dimensional light modulator such as a liquid crystal panel or a digital micromirror device (DMD). The illuminating unit irradiates red light, green light, and blue light sequentially. The red, green, and blue light is modulated by the two-dimensional light modulator, and then projected onto a screen.

The illuminating unit of a conventional projection display includes a light source, which irradiates white light, and a color separation unit, such as a color wheel, for separating the white light into red, green, and blue light. A large light source such as a metal halide lamp or an ultra high pressure mercury lamp is used as the light source. Therefore, the size of the illuminating unit is very large, which is disadvantageous and limits an ability to make the projection display small. In addition, since the red, green, and blue light is separated from the white light and irradiated to the light modulator, the light utility efficiency is low.

SUMMARY OF THE INVENTION

Exemplary embodiments of present invention provide a projection display including a line type light modulator having a high optical utilizing efficiency, which can be formed in a small size.

According to an aspect of the present invention, there is provided a projection display which projects color images on a screen The projection display includes: an illuminating unit which emits a plurality of linear beams that are in parallel to each other; a scroll unit which scrolls the plurality of linear beams; a line type light modulator which modulates the plurality of linear beams according to image signals; and a scan unit which scans the plurality of linear beams in a direction perpendicular to the scrolling direction.

The illuminating unit may include: a plurality of laser light sources which each emit a beam of light; and a plurality of beam shaping elements which convert the plurality of beams into the plurality of linear beams having predetermined widths.

The projection display may further include: a projection lens unit which projects the modulated plural linear beams onto the screen. The scan unit may be disposed between the projection lens unit and the screen. The scan unit may be disposed at a focal point of the projection lens.

The scroll unit may include a square prism which rotates.

According to another aspect of the present invention, there is provided a projection display which projects color images on a screen. The projection display includes: an illuminating unit which emits a plurality of linear beams that are in parallel to each other in a first direction; a line type light modulator which modulates the plurality of linear beams according to image signals; a light path converting unit which converts the plurality of linear beams into a plurality of regions of the light modulator; and a scan unit which scans the plurality of linear beams in a second direction that is perpendicular to the first direction.

The light path converting unit may include: a plurality of first diffraction devices, corresponding to the plurality of linear beams, which change diffraction directions electrically; and a plurality of second diffraction devices which change diffraction directions electrically, and which convert the plurality of linear beams that are diffracted by the plurality of first diffraction devices to be in parallel to each other in the first direction.

The illuminating unit may include: a plurality of laser light sources which each emit a beam of light; and beam shaping elements which convert the plurality of beams into the plurality of linear beams having predetermined widths.

The scroll unit may include a square prism which rotates.

BRIEF DESCRIPTION OF THE DRAWINGS

The above and other exemplary aspects of the present invention will become more apparent by the following detailed description of exemplary embodiments thereof, with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
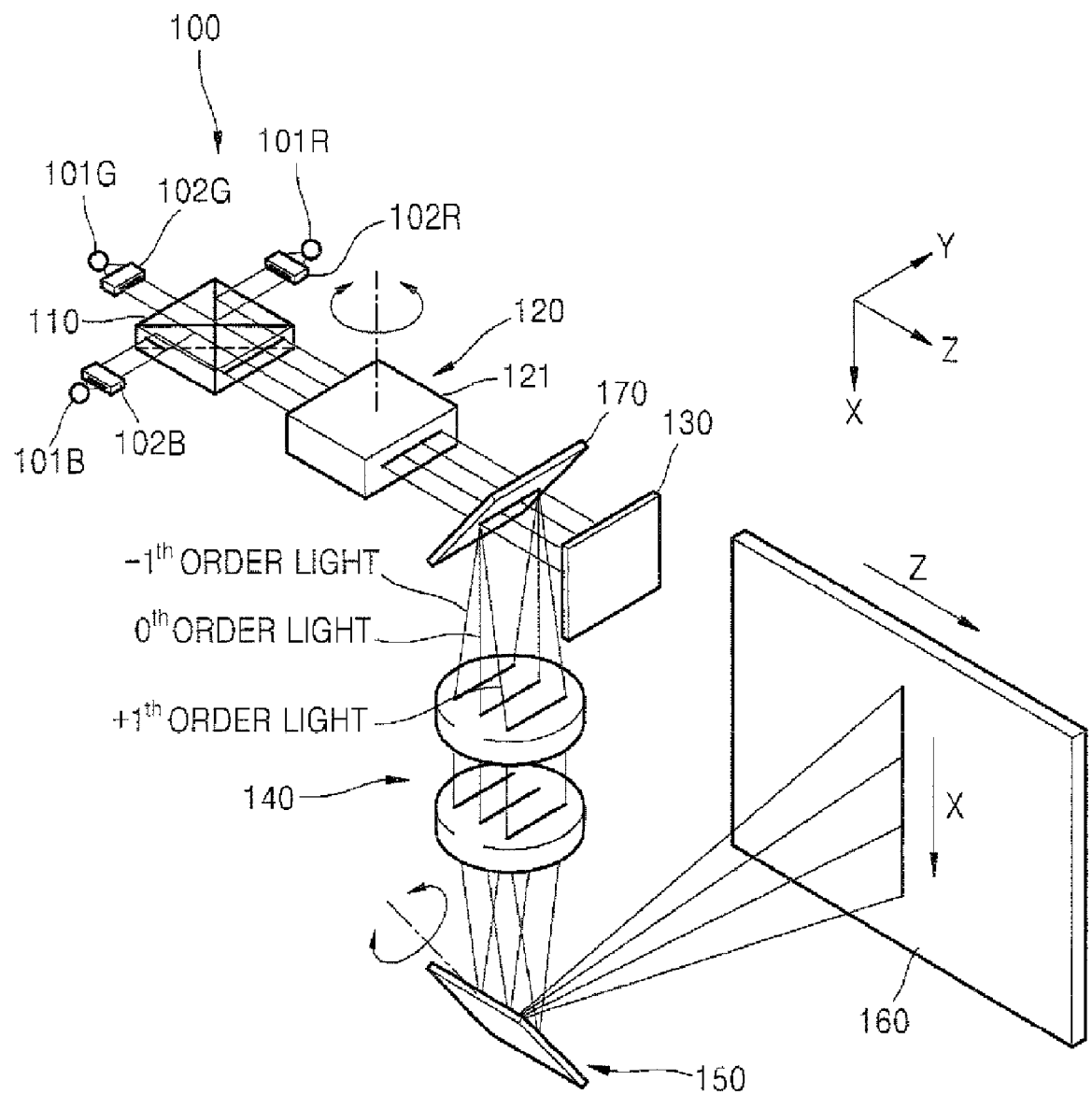
FIG. 1 is a block diagram of a projection display according to an exemplary embodiment of the present invention.

FIG. 1 is a block diagram of a projection display according to an embodiment of the present invention. Referring to FIG.

1, a projection display according to the current embodiment includes an illuminating unit 100, a scroll unit 120, a light modulator 130, and a scan unit 150.

Figure 2:
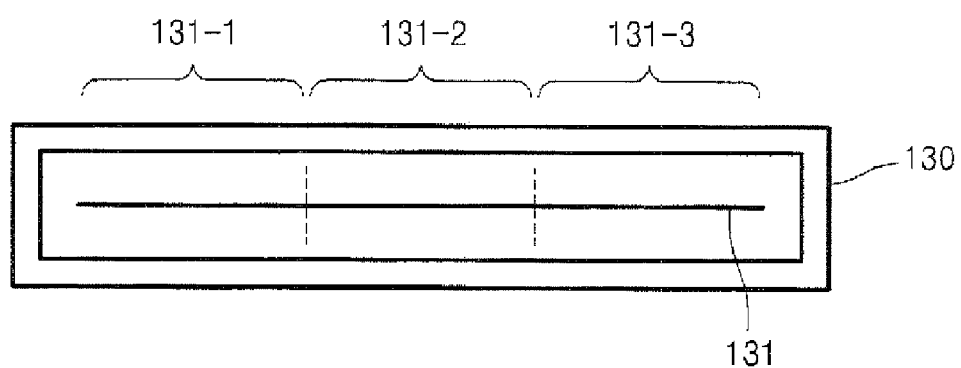
FIG. 2 is a plan view of a light modulator utilized in the projection display of FIG. 1.

The projection display according to the current embodiment includes a line type light modulator 130. The line type light modulator 130 is a light modulator having a one-dimensional light modulating portion 131 as shown in FIG. 2, unlike the conventional two-dimensional light modulator such as a liquid crystal display or a DMD. Grating light valve (GLV), Samsung optical modulator (SOM), and grating electromechanical system (GEMS) are examples of line type light modulators. A GLV controls a light proceeding direction using light diffraction, and the light modulating portion 131 includes a mirror array which reflects the light. The mirror array includes fixed mirrors and moving mirrors that are arranged in an alternating pattern. The light diffraction amount can be changed by moving the moving mirrors which electric signals. That is, if the fixed mirrors and the moving mirrors are located in the same plane, the incident light totally reflected. If the moving mirrors are arranged on a different plane from the fixed mirrors, the reflected light is diffracted at a different angle depending on whether it is incident on a moving mirror or a fixed mirror. Since GLVs are well known in the art, a detailed description of the GLV is omitted here. Hereinafter, an exemplary embodiment in which a GLV is used as a light modulator 130 will be described.

The illuminating unit 100 irradiates a plurality of linear beams: red (R), green (G), and blue (B). The three linear beams R, G, and B are in parallel to each other. That is, when the linear beams R, G, and B are projected onto the screen 160, the linear beams R, G, and B are in parallel in a first direction X or in a second direction Z. If the linear beams R, G, and B are in parallel in the first direction X or the second direction Z when the linear beams R, G, and B are finally projected onto the screen 160, all light paths, through which the linear beams R, G, and B pass, are also parallel. Hereinafter, a case in which the linear beams R, G, and B are projected onto the screen 160 in the first direction X will be described.

The illuminating unit 100 includes light sources 101R, 101G, and 101B irradiating red, green, and blue light respectively, and beam shaping elements 102R, 102G, and 102B converting the red, green, and blue light into the linear beams R, G, and B respectively. The light sources 101R, 101G, and 101B may be light emitting diodes (LEDs) or laser light sources.

Figure 10A:
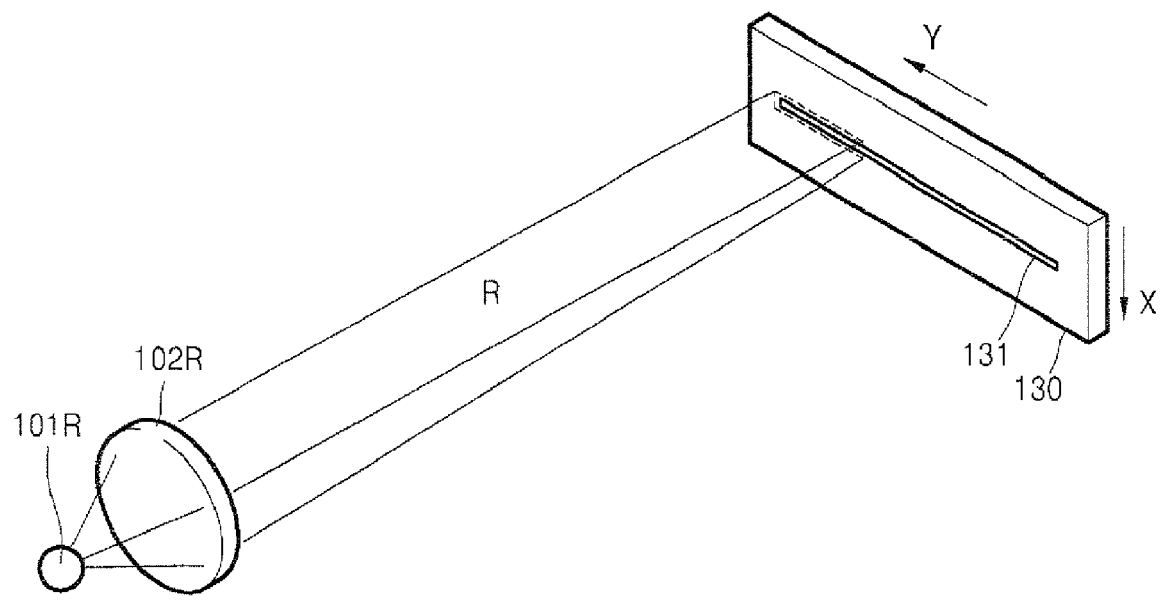
FIGS. 10A through 10C are views illustrating operations of a beam shaping elements according to an exemplary embodiment of the present invention.

Diffractive optical elements (DOEs), as shown in FIG. 10A, can be used as the beam shaping elements 102R, 102G, and 102B. However, any kind of element that can shape the light into a linear beam having a predetermined width can be used as the beam shaping element.

Figure 10B:
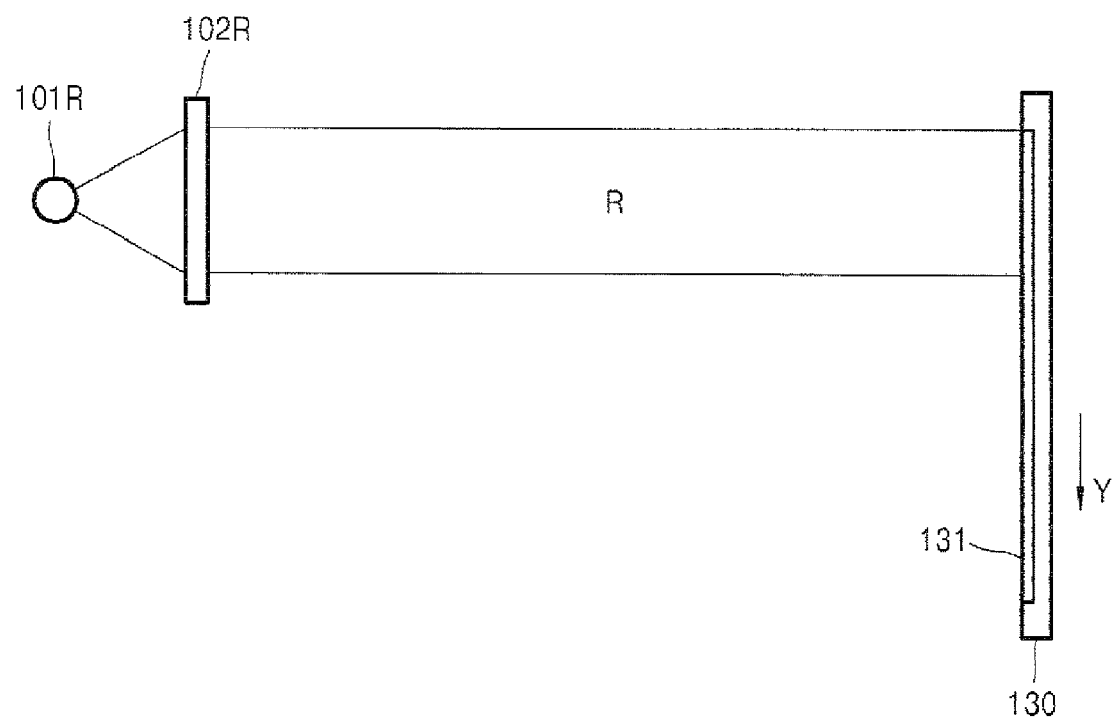
Figure 10C:
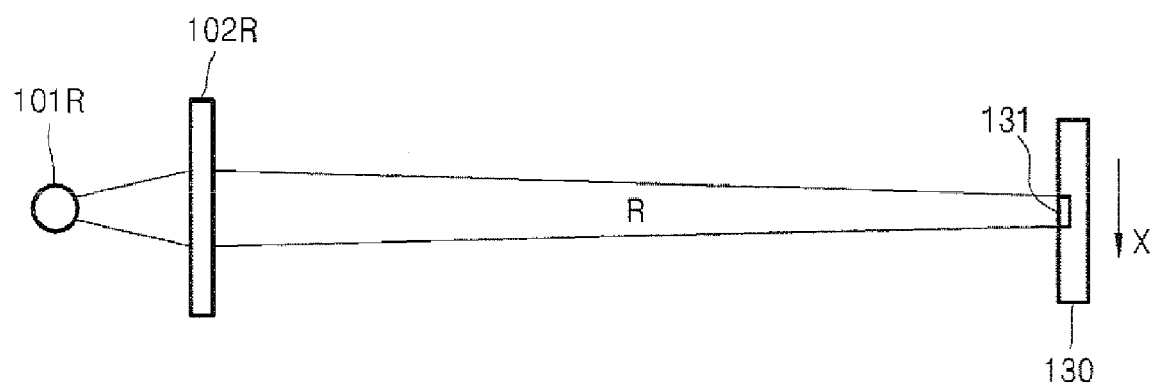

Here, the term "linear beam" is used to distinguish the currently-described beam from a surface light in a projection display which includes a two-dimensional light modulator; the term "linear beam" does not mean a one-dimensional linear beam strictly having no width. That is, it does not mean that the linear beams R, G, and B that are in parallel to each other on the screen 160 in the first direction X do not have a thickness in the second direction Z. In addition, a linear beam is a beam that can illuminate the light modulating portion 131 of the line type light modulator 130, as compared to a beam illuminating the conventional two-dimensional light modulator. FIGS. 10A through 10C show examples of shaping red light into the linear beam R using the beam shaping element 102R including the DOE. The light emitted from the light source 101R is shaped into the linear beam R having a width that can illuminate one of three areas obtained by dividing the light modulating portion 131 of the light modulator 130 in the first direction Y and having a width that can illuminate the light modulating portion 131 of the light modulator 130 in the second direction Z by the beam shaping element 102R.

An x-cube prism 110 arranges the linear beams R, G, and B that pass through the beam shaping elements 102R, 102G, and 102B in parallel to one another in a direction Y. If the light sources 101R, 101G, and 101B and the beam shaping elements 102R, 102G, and 102B are disposed in parallel to each other in the direction Y, there is no need to install the x-cube prism 110.

Figure 3A:
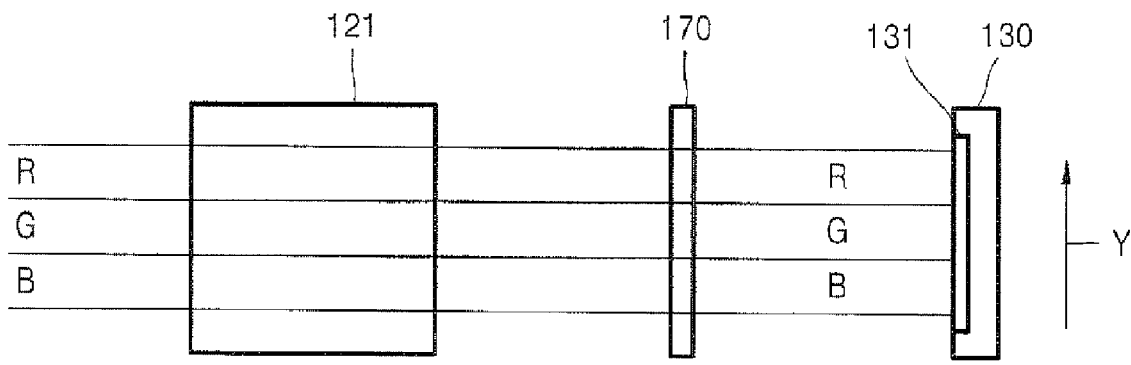
FIGS. 3A through 3C are views illustrating operations of a scroll unit in the projection display of FIG. 1.
Figure 3B:
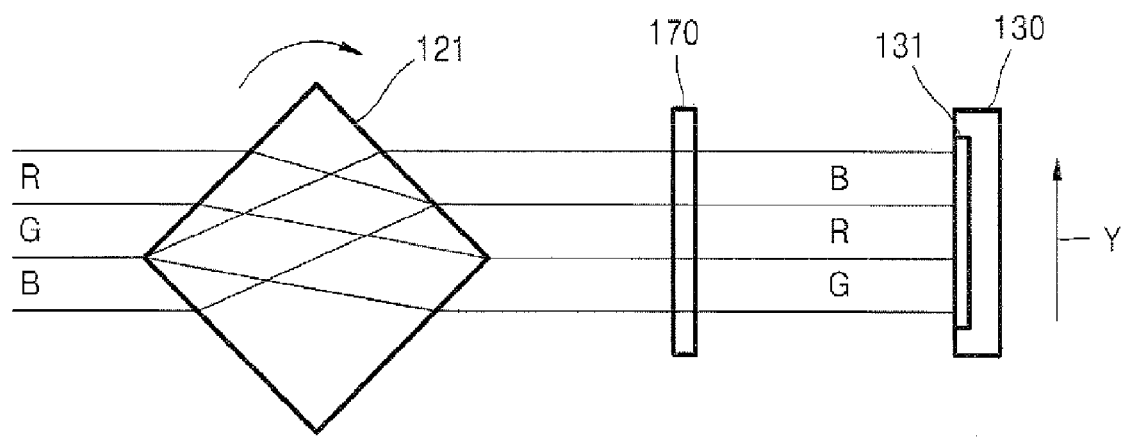
Figure 3C:
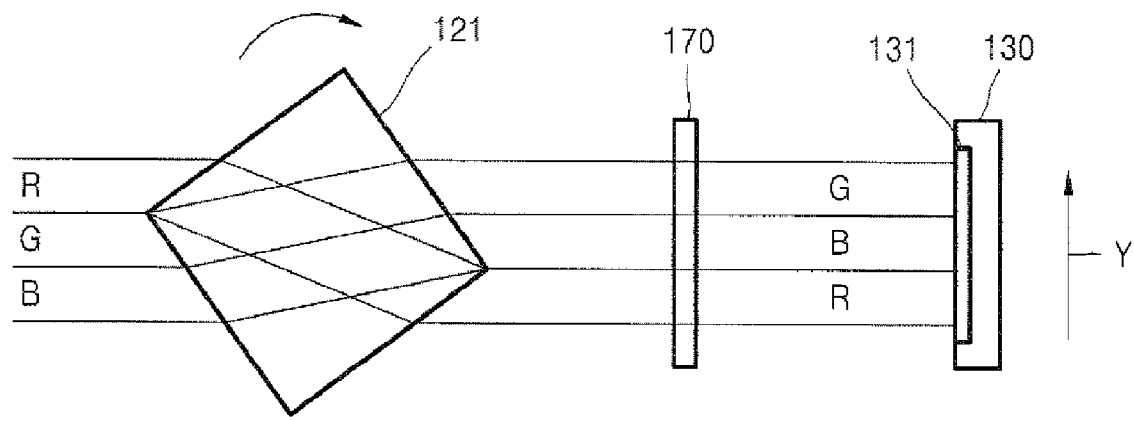

The scroll unit 120 scrolls the linear beams R, G, and B in the direction Y. In the current embodiment, a square prism 121 is used as shown in FIG. 1. Although it is not shown in the drawings, a driving unit for rotating the square prism 121 is required. FIGS. 3A through 3C illustrate operations of scrolling the linear beams R, G, and B by the square prism 121. Referring to FIG. 3A, the linear beams R, G, and B that are in parallel in the direction Y are incident perpendicularly to an incident surface of the square prism 121. The beams passing through the square prism 121 are incident into the light modulator 130 in an order of R, G, and B in the direction Y. When the square prism 121 is rotated, the incident angles of the linear beams R, G, and B with respect to the square prism 121 are changed. Accordingly, referring to FIG. 3B, the linear beams R, G, and B are incident into the light modulator 130 in an order of B, R, and G in the direction Y. In addition, when the square prism 121 is further rotated, the linear beams R, G, and B are incident into the light modulator 130 in an order of G, B, and R in the direction Y. In FIGS. 3A through 3C, examples in which the positions of the linear beams R, G, and B are completely changed, are shown. However, the linear beams R, G, and B are scrolled continuously in the direction Y while the square prism 121 rotates. The scroll unit 120 is not limited to the example shown in FIG. 1.

Figure 4:
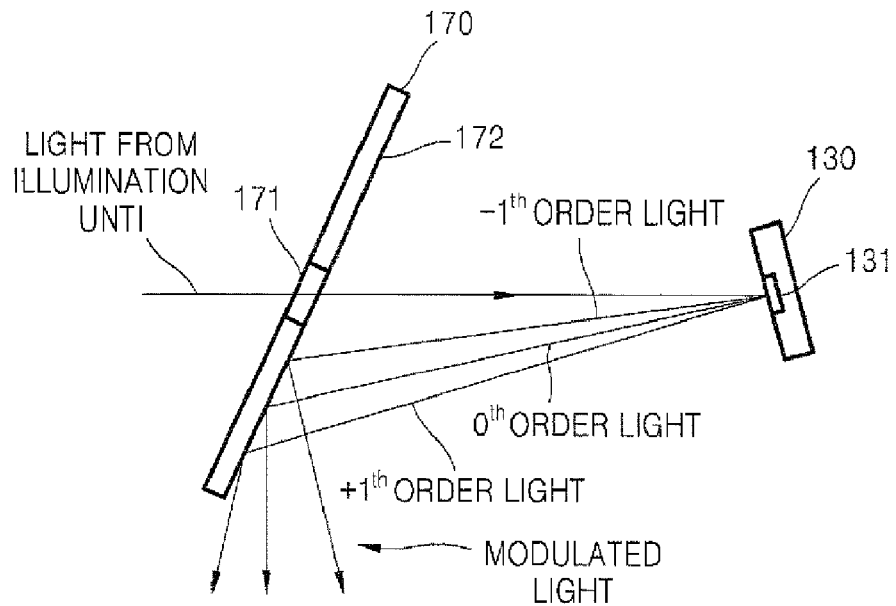
FIG. 4 is a view illustrating operations of the light modulator and a light path separator according to an exemplary embodiment of the present invention.

The light path separator 170 divides the illuminating light incident onto the light modulator 130 from a projecting light that has been modulated by the light modulator 130 and emitted. Referring to FIG. 4, the light path separator 170 includes a slit 171. A surface 172 of the light path separator 170 facing the light modulator 130 is a reflective surface that reflects the light. The shape of the light path separator 170 is not limited to the example shown in FIG. 4.

In the light modulator 130, when the fixed mirrors and the moving mirrors are located on the same plane, most of the illuminating light is reflected and is not diffracted. Therefore, the projected light is 0th order light shown in FIG. 4, and an amount of ±1th order lights is very small. When the moving mirrors are moved and arranged on a different plane from the plane where the fixed mirrors are arranged, the illuminating light is diffracted by the moving mirrors and the fixed mirrors. Most of the projected light is ±1th order lights, and an amount of 0th order light is very small. According to the current embodiment, the 0th order light is used to display images, and thus, modulated light beam is formed. That is, when the fixed mirrors and the moving mirrors are located on the same plane, bright pixels are displayed on the screen 160. When the moving mirrors are arranged on the different plane from that of the fixed mirrors, dark pixels are displayed on the screen 160.

Figure 5:
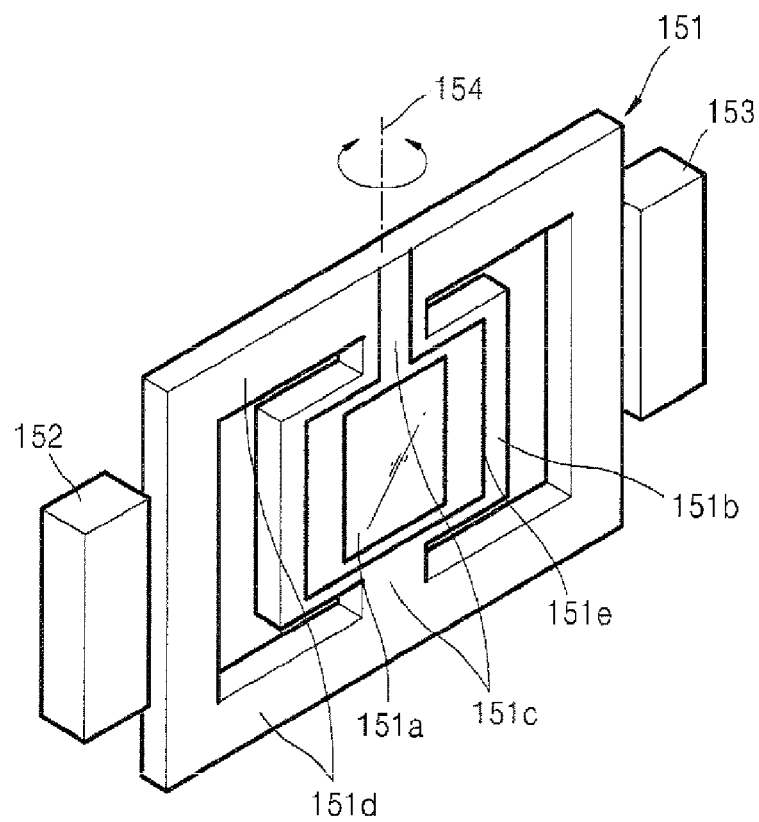
FIG. 5 is a perspective view of a shaking deflector as an example of a scan unit.

The scan unit 150 scans the modulated linear beams R, G, and B in the direction Z that is perpendicular to the direction X. A shaking deflector can be used as the scan unit 150. FIG. 5 illustrates an example of the shaking deflector. Referring to FIG. 5, the shaking deflector includes a main body 151, and magnet portions 152 and 153 facing each with the main body 151 disposed therebetween to form a magnetic field penetrating the main body 151. The main body 151 includes a pair of supporting portions 151d, facing each other; a pair of torsion bars 151c, extending inward from the pair of supporting portions 151d respectively; and a shaking portion 151b supported by the pair of torsion bars 151c. A mirror surface 151a, formed by coating a reflective layer using a metal deposition method, is formed on a surface of the shaking portion 151b. A driving coil portion 151e, surrounding the mirror surface 151a, is formed on the shaking portion 151b. When the electric current flows on the driving coil portion 151e, a Lorentz force acts on the driving coil portion 151e due to the magnetic field formed by the magnet portions 152 and 153. Accordingly, the shaking portion 151b rotates by a predetermined angle around the torsion bars 151c. The torsion bars 151c are twisted, and thus, a distortion torque is generated, and the distortion torque serves as a recovery force acting on the shaking portion 151b. According to the above structure, the electric current flowing through the driving coil portion 151e is switched or is an alternating current of a predetermined frequency flowing on the driving coil portion 151e, and thus, a vibration system including the shaking portion 151b and the torsion bars 151c generates resonance, and the shaking portion 151b vibrates around a virtual axis 154 extending from the torsion bars 151c with a predetermined frequency. The shaking portion 151b can be fabricated to have a small size and a low inertia using a micro electromechanical systems (MEMS) technology, and thus, the shaking deflector can be vibrated stably at a high speed. Although it is not shown in the drawings, a polygon mirror that is used to scan the beam onto a photosensitive medium in an electrophotographic image forming apparatus can be used as the scan unit 150. Hereinafter, a case in which the shaking deflector is used as the scan unit 150 will be described.

In order to reduce the size, the scan unit 150 may be located on a focal position of a projection lens unit 140 for projecting the linear beams R, G, and B onto the screen 160. According to the projection display using the GLV as the light modulator 130, the 0th order light is used as the projecting light, and thus, the mirror surface 151a may be formed on the portion of the shaking portion 151b on which the 0th order light is incident. Therefore, the −1th and +1th order light is not projected onto the screen 160, and the 0th order light is projected onto the screen 160.

Operations of the projection display having the above structure will be described as follows.

Figure 6A:
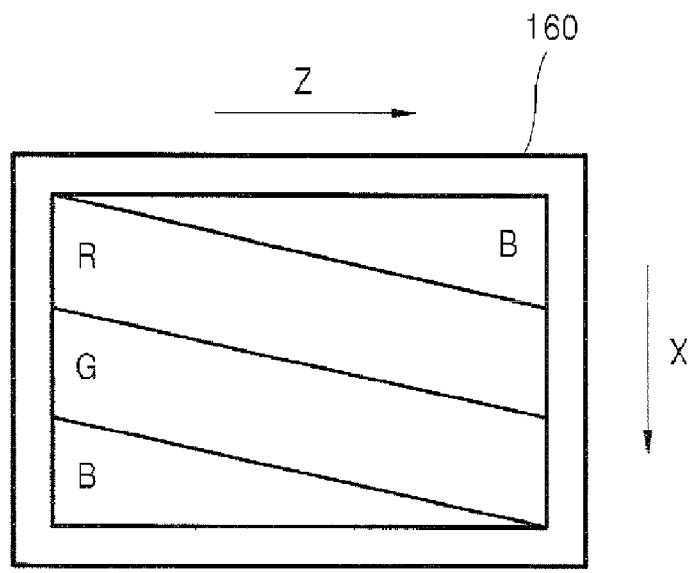
FIGS. 6A through 6C are views of images displayed on a screen by the projection display of FIG. 1.
Figure 6B:
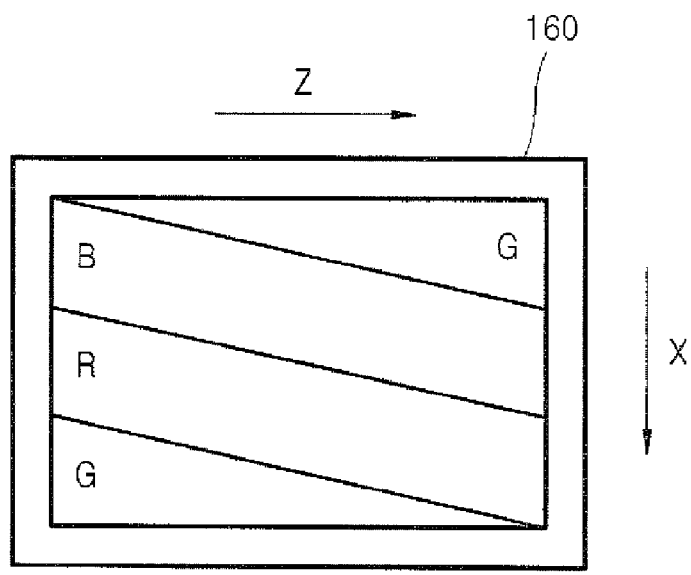
Figure 6C:
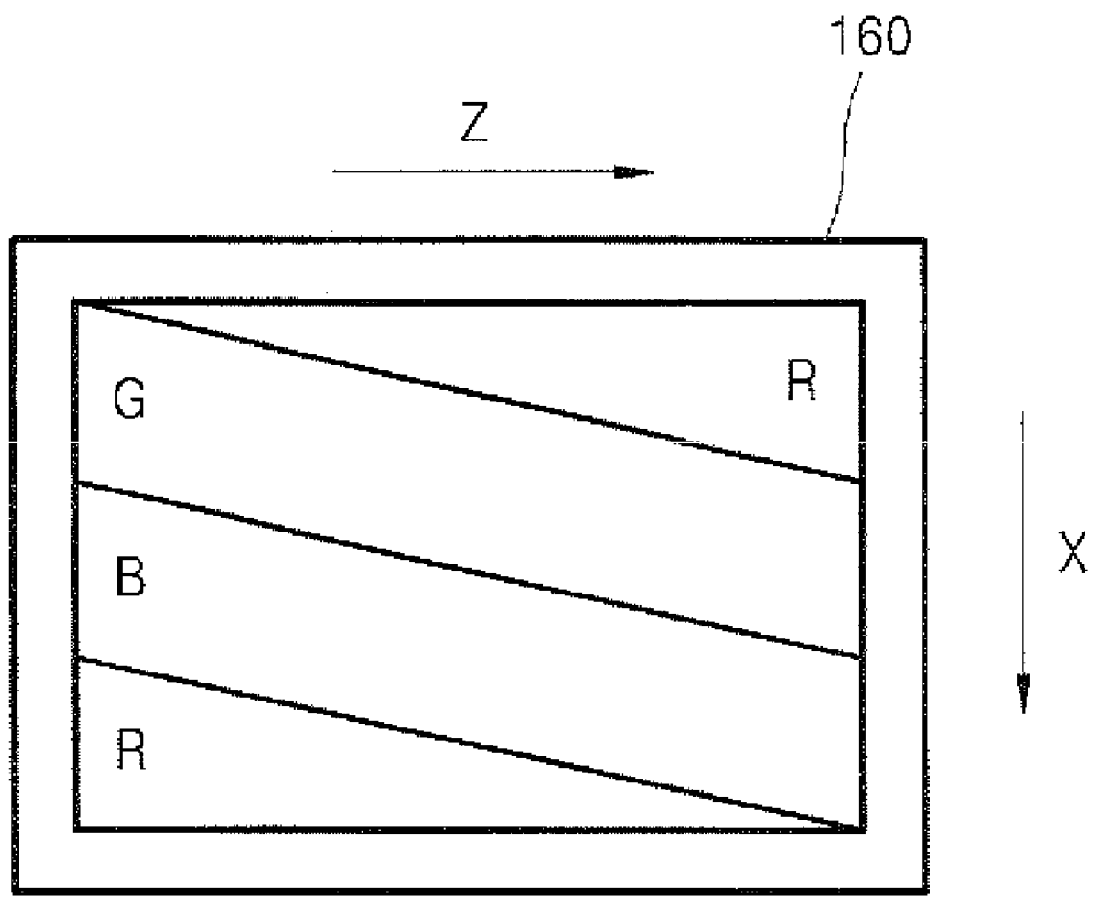

Red, green, and blue light irradiated from the light sources 101R, 101G, and 101B, respectively, are converted into the linear beams R, G, and B having predetermined widths by the beam shaping elements 102R, 102G, and 102B. The linear beams R, G, and B are arranged in parallel to each other in the direction Y so that the linear beams R, G, and B are incident into the light modulating portion 131 of the light modulator 130 via the x-cube prism 120. The linear beams R, G, and B are incident into the rotating square prism 121. When the square prism 121 rotates, the linear beams R, G, and B are scrolled in the direction Y successively and are incident into the light modulator 130 as shown in FIGS. 3A through 3C. The light modulator 130 modulates the linear beams R, G, and B according to image information by color unit. The modulated linear beams R, G, and B pass through the projection lens unit 140, and then, are incident into the scan unit 150. The electric current is supplied to the driving coil portion 151e, and thus, the shaking portion 151b is vibrated with a predetermined resonance frequency, and the linear beams R, G, and B reflected by the mirror surface 151a are scanned in the second direction Z. Accordingly, the linear beams R, G, and B are successively scrolled and scanned onto the screen 160 while being inclined on the screen 160 as shown in FIGS. 6A through 6C. The light modulator 130 is synchronized with the scroll unit 120 and the scan unit 150 so as to modulate the linear beams R, G, and B that are scrolled in the direction Y (and then in the direction X as incident on the screen 160) and scanned in the second direction Z at the same time according to the red, green, and blue image information.

According to the above operations, the color image can be displayed using the line type light modulator 130.

Figure 7:
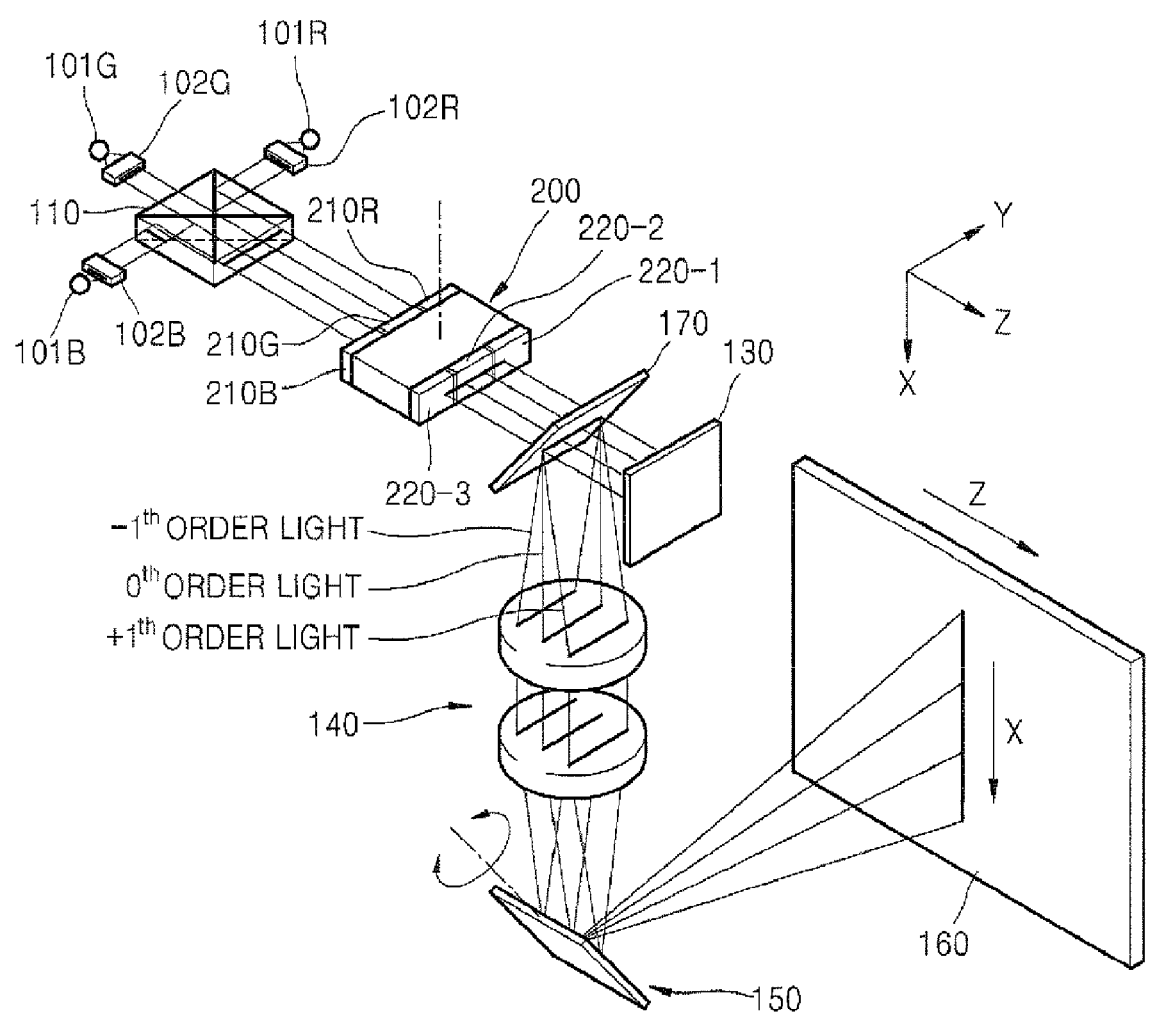
FIG. 7 is a block diagram of a projection display according to another exemplary embodiment of the present invention.

FIG. 7 is a block diagram of a projection display according to another embodiment of the present invention. Referring to FIG. 7, the projection display according to the current embodiment includes an illuminating unit 100 irradiating a plurality of linear beams R, G, and B that are in parallel to each other in a direction Y, a line type light modulator 130 modulating the plurality of linear beams R, G, and B according to image signals, a light path converting unit 200 inputting the plurality of linear beams R, G, and B into a plurality of regions on the light modulator 130 sequentially, and a scan unit 150 scanning the modulated linear beams R, G, and B in a direction Z. The illuminating unit 100, the light modulator 130, the scan unit 150, and the projection lens unit 140 are actually the same as those shown in FIG. 1, and thus, detailed descriptions for those will be omitted.

According to the projection display of the current embodiment, a plurality of linear beams R, G, and B are incident into a plurality of regions 131-1, 131-2, and 131-3 on the light modulating portion 131 of the light modulator 130 sequentially. That is, the plurality of linear beams R, G, and B are incident into the light modulating portion 131 simultaneously. However, colors of the light incident into the plurality of regions 131-1, 131-2, and 131-3 of the light modulating portion 131 change according to time. To do this, the light path converting unit 200 includes first diffraction devices 210R, 210G, and 210B and second diffraction devices 220-1, 220-2, and 220-3, as shown in FIG. 8. The first diffraction devices 210R, 210G, and 210B correspond to the linear beams R, G, and B, respectively. Diffraction directions of the first diffraction devices 210R, 210G, and 210B and the second diffraction devices 220-1, 220-2, and 220-3 can be adjusted electrically. For example, an orientation of the liquid crystal layer may be changed using the electric field in order to adjust the diffraction direction. The diffraction devices are well known in the art, and thus, detailed descriptions are omitted. The second diffraction devices 220-1, 220-2, and 220-3 convert the linear beams R, G, and B, that are diffracted by the first diffraction devices 210R, 210G, and 210B, to be parallel to each other in the direction Y. The second diffraction devices 220-1, 220-2, and 220-3 correspond to the regions 131-1, 131-2, and 131-3 of the light modulating portion 131, respectively.

Figure 8A:
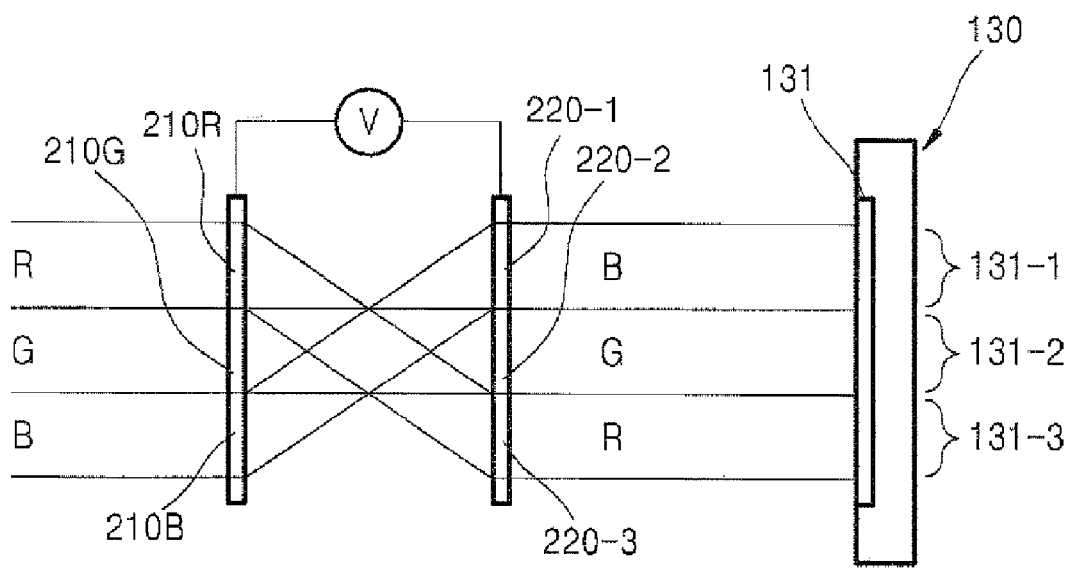
FIGS. 8A through 8C are views illustrating operations of a light path converting unit according to an exemplary embodiment of the present invention.
Figure 8B:
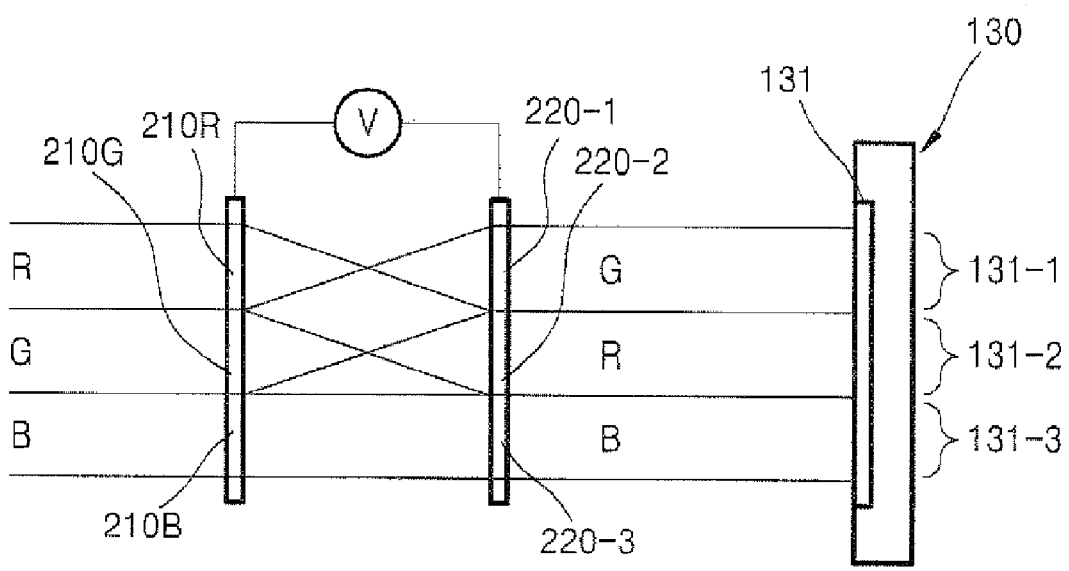

Referring to FIG. 8A, when the first diffraction devices 210R, 210G, and 210B correspond to the second diffraction devices 220-3, 220-2, and 220-1 respectively, the linear beams B, G, and R can be incident onto the regions 131-1, 131-2, and 131-3. Referring to FIG. 8B, when the first diffraction devices 210R, 210G, and 210B correspond to the diffraction devices 220-2, 220-1, and 220-3 respectively, the linear beams G, R, and B can be incident onto the regions 131-1, 131-2, and 131-3. In addition, referring to FIG. 8C, when the first diffraction devices 210R, 210G, and 210B correspond to the second diffraction devices 220-1, 220-3, and 220-2 respectively, the linear beams R, B, and G can be incident onto the regions 131-1, 131-2, and 131-3. By repeating the above three states, the linear beams R, G, and B can be sequentially irradiated onto the regions 131-1, 131-2, and 131-3.

Hereinafter, operations of the projection display having the above structure will be described as follows.

Figure 8C:
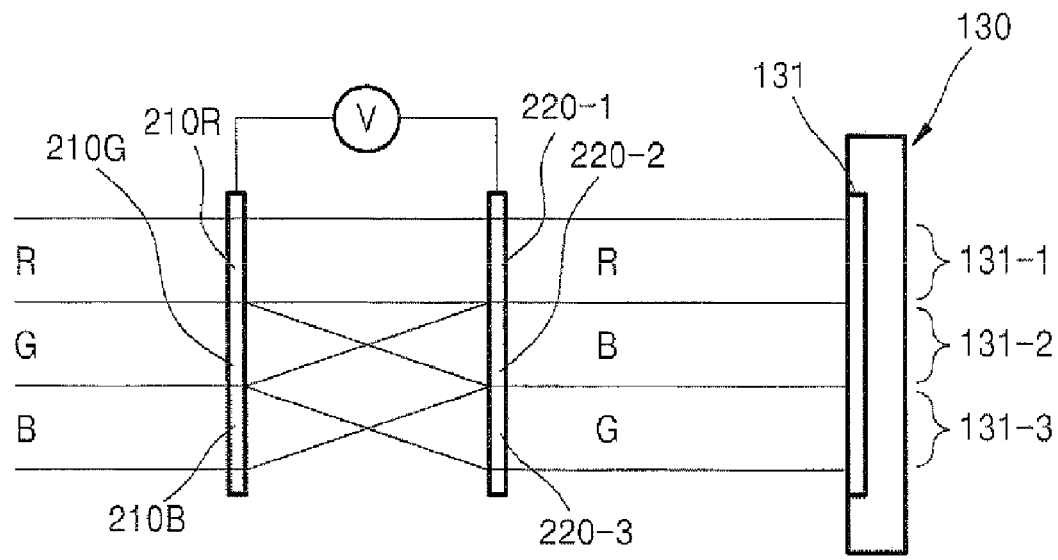
Figure 9A:
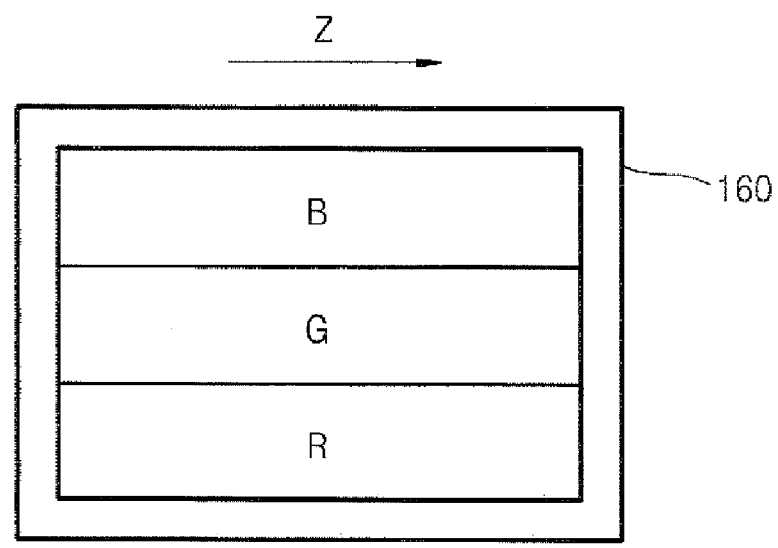
FIGS. 9A through 9C are views of images displayed on a screen by the projection display of FIG. 7.
Figure 9B:
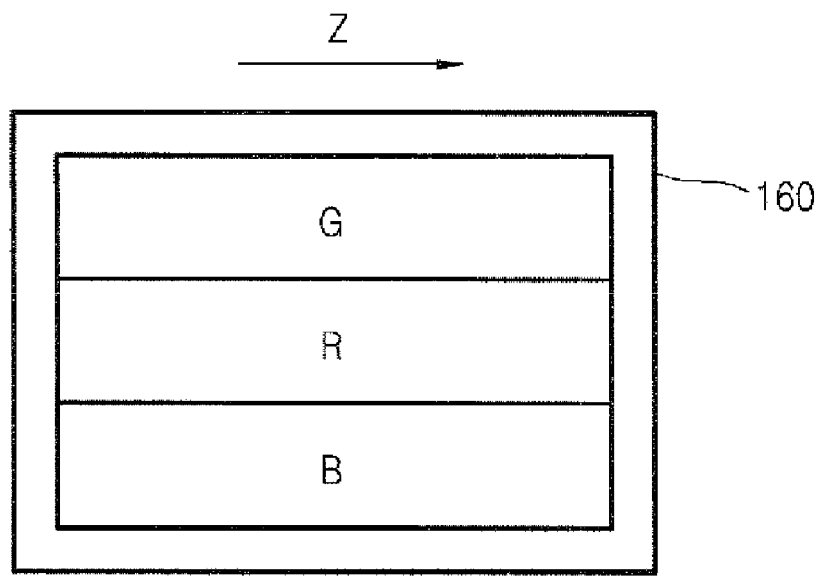
Figure 9C:
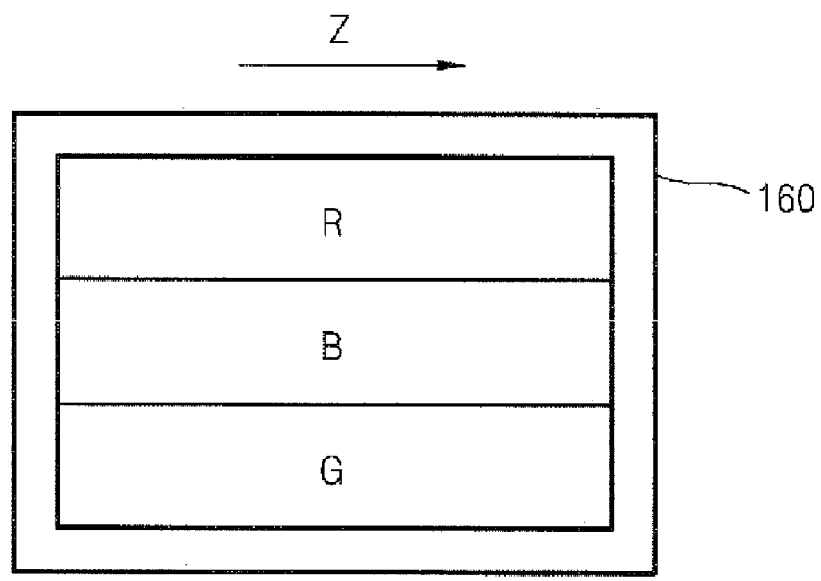

Red, green, and blue light irradiated from the light sources 101R, 101G, and 101B are converted into the linear beams R, G, and B having predetermined widths by the beam shaping elements 102R, 102G, and 102B. The linear beams R, G, and B are arranged in parallel to each other in the direction Y so as to be incident onto the light modulating portion 131 of the light modulator 130 via the x-cube prism 110. The linear beams R, G, and B are incident onto the light path converting unit 200. In addition, the linear beams R, G, and B are incident onto the regions 131-1, 131-2, and 131-3 of the light modulator 130 by adjusting the diffraction directions of the first diffraction devices 210R, 210G, and 210B and the second diffraction devices 220-1, 220-2, and 220-3, as shown in FIGS. 8A through 8C. The light modulator 130 modulates the linear beams R, G, and B according to the image information by the color unit. The modulated linear beams R, G, and B are incident onto the scan unit 150 after passing through the projection lens unit 140. When the electric current is supplied to the driving coil portion 151b, the shaking portion 151c is vibrated with a predetermined resonance frequency, and the linear beams R, G, and B reflected by the mirror surface 151a are scanned in the direction Z. Therefore, the linear beams R, G, and B are scanned on the screen 160 as shown in FIGS. 9A through 9C.

According to the above operations, the color image can be display using the line type light modulator 130. According to the above structure, a light separating unit such as a color wheel for separating red, green, and blue light from the white light is not required, and thus, a structure of the illuminating unit 110 can be simple. In particular, if laser light sources irradiating red, green, and blue light are used as the light sources 101R, 101G, and 101B, the structure of the illuminating unit 100 can be further simplified.

In a conventional projection display displaying the color images by separating the red, green, and blue light from the white light, modulating and projecting the light sequentially on the screen, for example, when the red light is irradiated, the separated green and blue light is discarded, and thus, the optical utility efficiency is very low. However, according to the projection display of the present invention, the red, green, and blue light is simultaneously irradiated, the optical utility efficiency is improved.

In addition, according to a conventional projection display including a two-dimensional light modulator, the illuminating unit should generate the surface light having a constant light intensity, and an optical element to do this must be installed. However, according to the projection display of the present invention, the linear beams R, G, and B are scrolled in the first direction Y (FIGS. 6A through 6C) or switched (FIGS. 9A through 9C), and scanned in the direction Z simultaneously, and thus, there is no need to generate the surface light. In addition, since the linear beams R, G, and B are successively scrolled in the direction Y by the scroll unit 120 (and in the direction X, as incident on the screen 160), there is no need to form the linear beams R, G, and B having a constant light intensity in the direction Y (or X). Therefore, the structure of the illuminating unit 100 can be simplified, and the illuminating unit 100 can be fabricated to have a small size.

In addition, according to an exemplary projection display of the present invention, the linear beams R, G, and B are shaken timely and spatially using the scroll unit 120 and the scan unit 150, and thus, the phase of the laser beam reaching the screen 160 becomes irregular. Therefore, when laser light sources are used as the light sources 101R, 101G, and 101B, a speckle problem caused by a coherence of the laser beam can be solved.

The scan unit 150 such as the shaking deflector can be fabricated in a small size using MEMS technology. Therefore, according to the projection display of the present invention, a projection display having high optical utility efficiency and a small size can be fabricated.

As described above, according to the present invention, a small size projection display having the high optical utility efficiency and displaying color images using the line type light modulator can be fabricated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projection display which projects color images on a screen, the projection display comprising:
   an illuminating unit which emits a plurality of linear beams that are in parallel to each other;
   a scroll unit which scrolls the plurality of linear beams;
   a line type light modulator which modulates the plurality of linear beams according to image signals; and
   a scan unit which scans the plurality of linear beams in a direction perpendicular to the scrolling direction.

2. The projection display of claim 1, wherein the illuminating unit comprises:
   a plurality of laser light sources which each emit a beam of light; and
   beam shaping elements which convert the plurality of beams into the plurality of linear beams having predetermined widths.

3. The projection display of claim 1, further comprising:
   a projection lens unit which projects the modulated plurality of linear beams onto the screen,
   wherein the scan unit is disposed between the projection lens unit and the screen.

4. The projection display of claim 3, wherein the scan unit is disposed at a focal point of the projection lens.

5. The projection display of claim 1, wherein the scroll unit comprises a square prism which rotates.

* * * * *